Inventors
THEODORE H. SCHOEPF,
DAVID M. RITCHIE,
By Toulmin & Toulmin
Attorneys

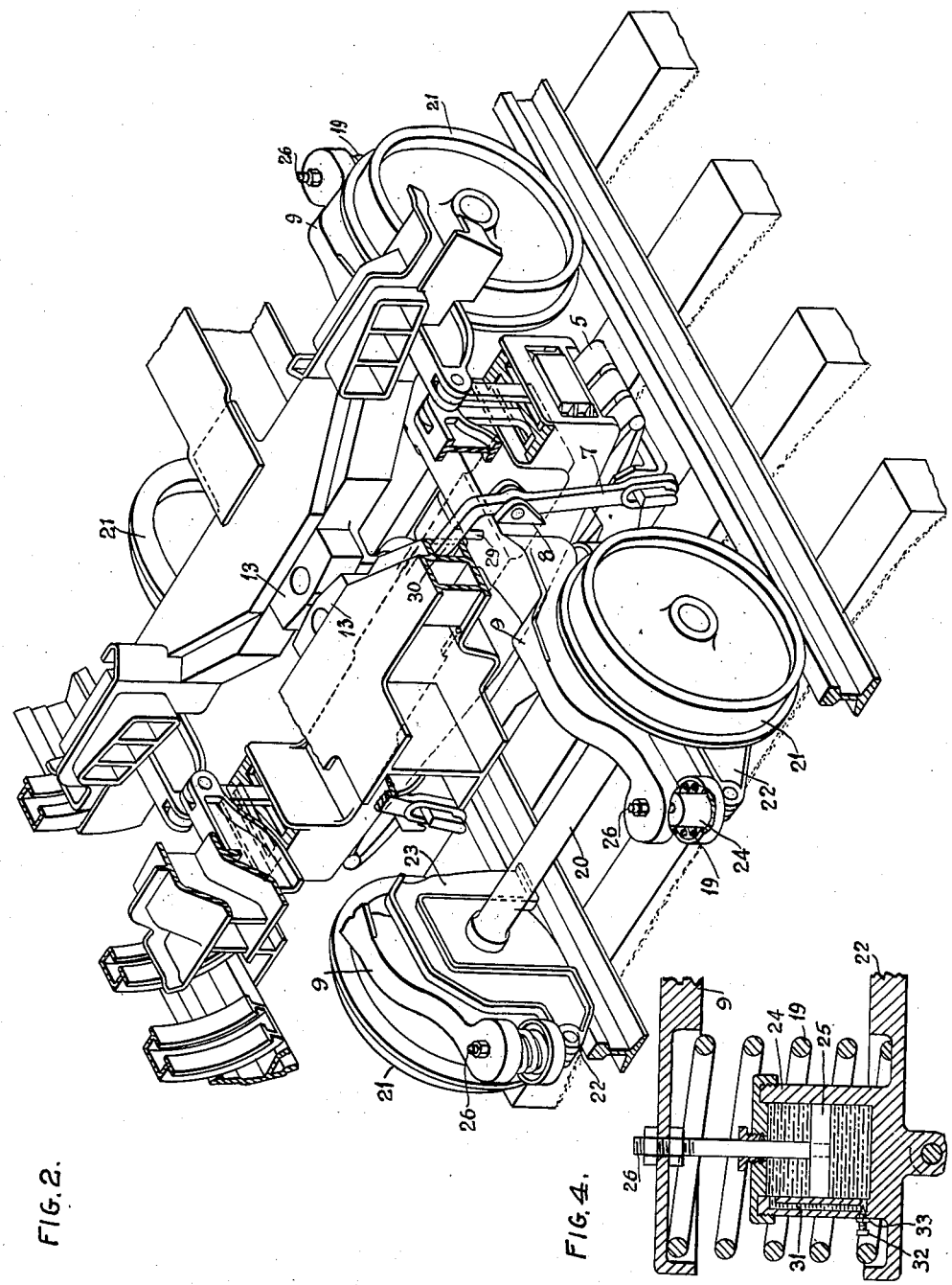

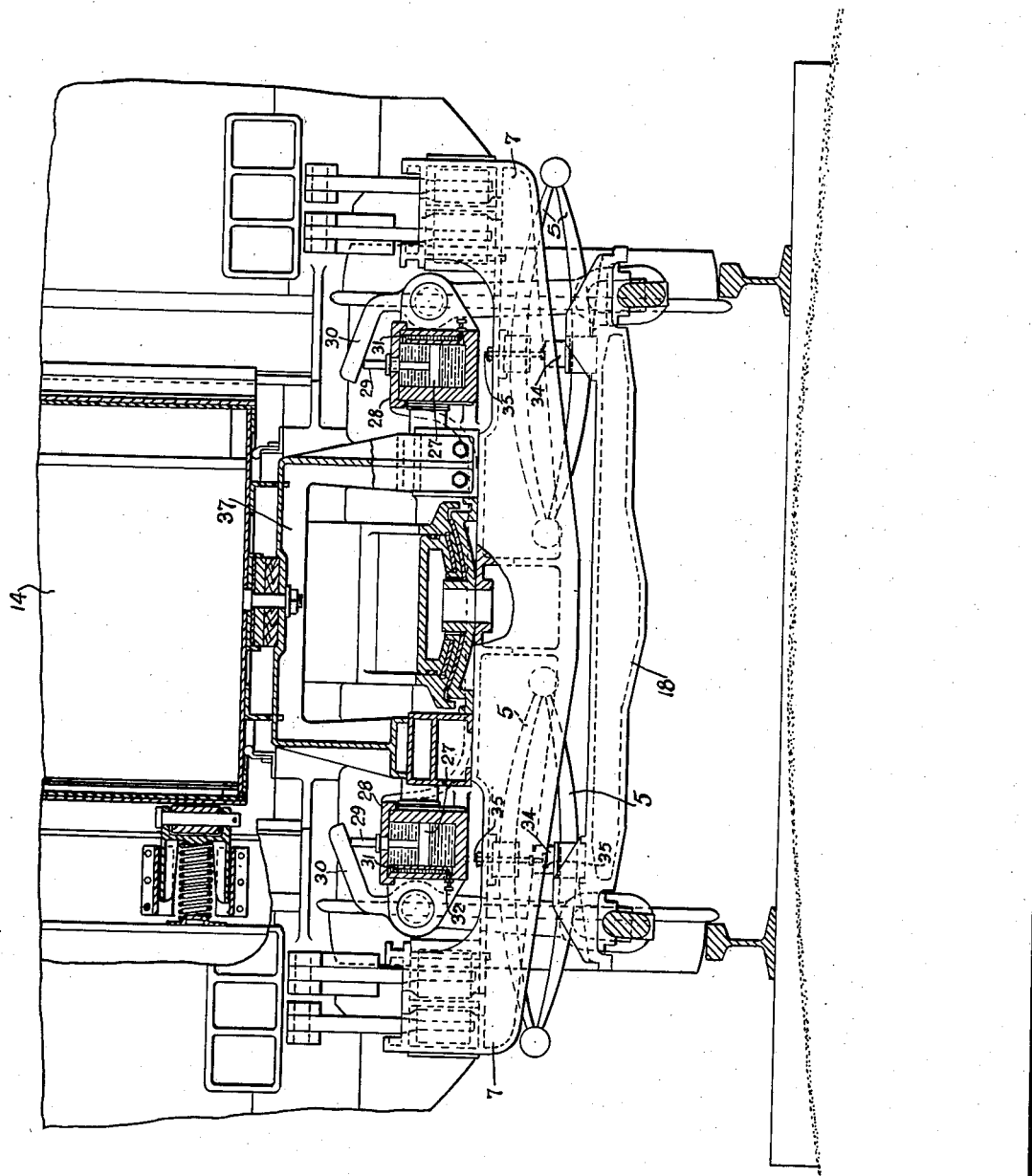

Patented June 6, 1939

2,161,685

UNITED STATES PATENT OFFICE 2,161,685

APPARATUS FOR SHOCK ABSORBERS FOR ARTICULATED TRUNNIONS

Theodore H. Schoepf and David M. Ritchie, Cincinnati, Ohio, assignors to The Cincinnati Traction Building Company, Cincinnati, Ohio, a corporation of Ohio Application March 5, 1935, Serial No. 9,490

2 Claims. (Cl. 105—3)

Our invention relates to articulated cars and in particular to shock absorbing and shock dampening means for articulated vehicles in order to reduce the movement of the vehicles so as to maintain them in predetermined relationship one to the other.

In articulated railway cars the primary problem is to maintain the adjacent floors of the adjacent cars in the same horizontal plane. Due to the fact that the springs of the trucks and the mounting of the cars on the trunnions and the center plates on the truck set up a number of variable factors, it is particularly important in an articulated car construction to dampen the normal vibration of the helical and leaf springs. This disadvantage of the helical spring is that its rapidity of movement and response to shock serves to break up the shocks in short increments that produce a violent chatter. The leaf spring being slow in its response to shock is so inert that these smaller in length but heavier in amount impacts that have passed through the coil spring pass directly through the leaf spring into the body and particularly into the trunnion joint. Directly over the trunnion joint and mounted upon the bolster of the truck is the metallic vestibule, where the sounds and the vibrations are amplied.

We further find that where the shocks are sufficient to flex the leaf springs, the reaction of the leaf springs may become very serious, particularly if it becomes amplified by an accumulation of synchronous impacts or forces applied during the movement of the cars. This sets up excessive movements between the truck and center plate on one hand and the trunnions and bodies on the other hand. As it is desirable to reduce the movement vertically and torsionally in an articulated joint, is is desirable to reduce and dampen these unrestricted movements of the leaf springs.

In order to accomplish this purpose, we have found that by applying a hydraulic dampener and shock absorber between the axles and the truck frame, particularly in conjunction with the helical spring interposed at this point, and by interposing a similar hydraulic mechanism between the leaf spring and the truck or between the leaf spring and the trunnion supports, or between the halves of a full elliptic spring, we are able to control both the accumulated synchronous movements that otherwise would build up to dangerous proportions at high speed, reduce the chatter and vibration, and we provide for an easy movement of the spring structure with a minimum of independent movement of the respective car bodies, vestibule and truck.

As it is now becoming the practice to have additional steadying connections between the truck and the vestibule in addition to the resting of the vestibule on the bolster of the truck, there is an additional reason for reducing the relative movements between the truck and the remainder of the car.

Referring to the drawings, Figure 1 is a vertical longitudinal section through the axis of the train at the articulated joint and through the truck.

Figure 2 is an isometric perspective of the truck with the end sill castings of the car body and trunnions in the center plate in section.

Figure 3 is a transverse section through the truck showing the arrangement of the hydraulic mechanism between the halves of the full elliptic spring; and also showing the means of dampening the side sway of the body.

Figure 4 is a section through the helical spring shock absorber.

Figure 1:
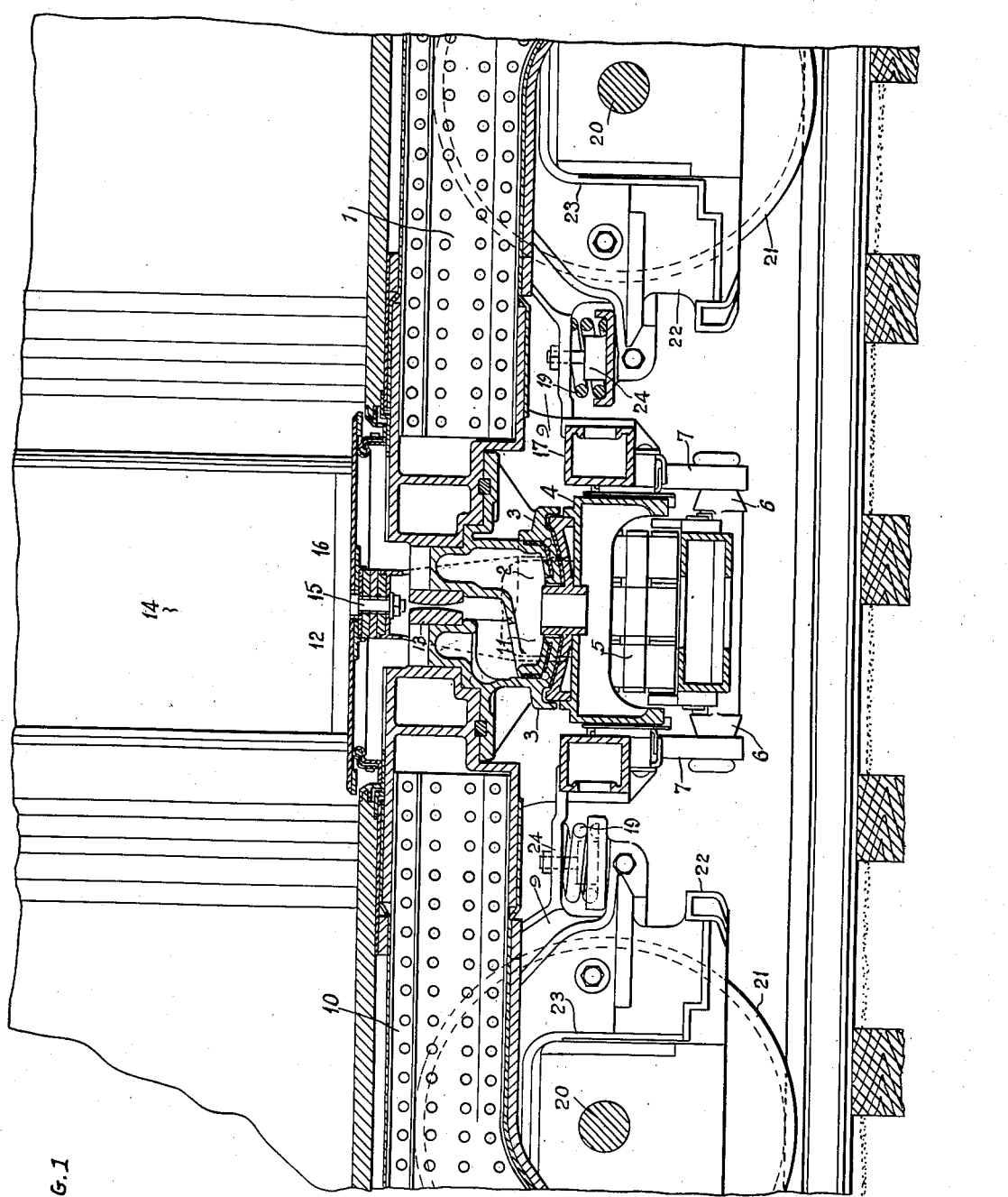

Referring to the drawings in detail, 1 designates an end of a car floor provided with a trunnion 2 which is mounted in a socket plate 3 that is mounted on the bolster 4 of a truck. This bolster is supported upon a full elliptic spring designated 5. The ends of this spring are supported by a cradle 6 resting on the swinging links 7 pivoted at their upper ends as at 8 to the side frames 9 of a truck.

The other car body 10 has its trunnion 11 also resting in the center plate or socket 3. A bolster supported strap 12 is arranged above the abutting ends 13 of the end sill castings and is arranged to carry the vestibule 14. The vestibule is usually attached thereto by a bolt 15 and has depending ears 16 engaging the sides of the strap 12 so that as the truck moves, the vestibule will move with it. The bolster 4 is guided between the transoms 17. The bolster rests upon the elliptic spring 5 while the elliptic spring 5 in turn rests upon the spring plank 18 that is supported on the pivotal end members 8 and links 7.

The side frame 9 of the truck is mounted at either end on helical springs 19, arranged on either side of the axles 20 mounted on the wheels 21. These helical springs 19 are supported on the journal brackets 22 mounted on the bearing housings 23 that carry the load on the axles 20.

Interposed between the side frame 9 and the journal brackets 22 within the helical spring 19 is a hydraulic dashpot comprising a cylinder 24 having a piston 25 therein and a piston rod 26. The piston rod engages the side frame 9 and the cylinder is carried within the helical spring 19 upon the journal bracket 22.

The swaying of the bolster laterally is likewise dampened by the movement of the piston 27 in the side frame cylinder 28. This piston is connected by the piston rod 29 and arm 30 to the supporting link 7.

In this case, as in the previous case, a by-pass passageway 31 is provided from one side of the piston to the other and the rate of flow of the liquid is controlled by the adjusting screw 32 and lock nut 33.

The third place of application of the hydraulic snubbers is between the halves of the elliptic spring 5 as at 34 where the cylinder 34 is connected to one-half the spring and the piston rod 35 with its piston 36 is connected to the other half of the spring with the usual by-pass 31, and adjusting means 32 and 33 is provided.

Thus the dampening and shock absorbing effect of a hydraulic means is employed to control the movement of the coil springs 19 (Figs. 2 and 4), the leaf springs 5 and the side sway of the spring plank. The shocks and vibrations are therefore reduced in amount, force and effect.

It will be understood that we desire to comprehend within our invention such modifications as may be necessary to adapt it to varying conditions and uses.

Having thus fully described our invention, what we claim as new and desire to secure by Letters Patent, is:

1. In a railway train, the combination with two car bodies, a truck common to both bodies, and an articulated connection between the car bodies and the truck, such articulation comprising trunnions carried by the car bodies and a socket plate carried by a bolster on the truck; of a spring plank carried by the truck, leaf springs mounted on the spring plank and connected to the bolster, and hydraulic means mounted on the truck, and links connecting the spring plank with one set of such hydraulic devices, and other hydraulic means connected each to the spring members of the leaf springs, said hydraulic devices adapted to create and apply dampening and shock absorbing effects to the bolster, whereby the bolster is relieved of vertical shocks and side sway, and whereby these effects are transmitted to the car bodies through the articulated connection with the truck.

2. In a railway train, the combination with two car bodies, a truck common to both bodies having wheels, axles and side frames, and an articulated connection between the car bodies and the truck, such articulation comprising trunnions carried by the car bodies and a socket plate carried by the bolster on the truck, of coil springs carried by said axles and supporting said side frames; hydraulic means associated with said coil springs for limiting the movement thereof, a spring plank, the bolster and elliptic springs therebetween, hydraulic means interposed between said bolster and spring plank for regulating the movements thereof, means for swingingly supporting said spring plank on said side frames, hydraulic shock absorbing means associated with said side frames for regulating the swinging movement of said spring plank and bolster, and a vestibule supported on said bolster above said trunnions and overlapping the ends of the car frames.

THEODORE H. SCHOEPF.
DAVID M. RITCHIE.